10, 1964

United States Patent Office
3,156,684
Patented Nov. 10, 1964

3,156,684
C-HOMO-Δ⁴-PREGNENE-17α,21-DIOL-3,20-DIONE, ITS ESTERS, INTERMEDIATES AND PROCESS
Georges Muller, Nogent-sur-Marne, Seine, and Roland Bardoneschi, Le Vert-Galant, Seine-et-Oise, France, assignors to Roussel-UCLAF, S.A., Paris, France, a corporation of France
No Drawing. Filed June 7, 1963, Ser. No. 286,186
Claims priority, application France, June 14, 1962, 900,743
32 Claims. (Cl. 260—239.55)

The present invention relates to a process of preparation of steroid derivatives having a modified structure and the products obtained by this process.

The invention more particularly relates to a process of preparation of desoxy corticosteronic derivatives having a modified, 7-membered, C ring or a C-homo-derivative, namely. C-homo-Δ⁴- pregnene-17α,21-diol-3,20-dione as well as its esters in the 21 position with organic carboxylic acids, such as the acetate.

These compounds correspond to the following general formula:

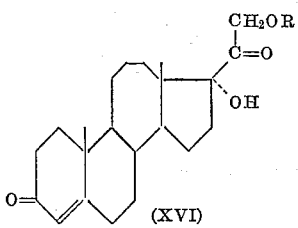

(XVI)

in which R represents hydrogen or the acyl radical of an organic carboxylic acid having from 1 to 18 carbon atoms.

An object of the present invention is the obtention of a C-homo-steroid of the formula

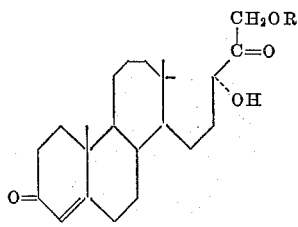

wherein R is selected from the group consisting of hydrogen and the acyl radical of an organic carboxylic acid having from one to eighteen carbon atoms.

Another object of the invention is the development of a process of effecting C-homoannulation.

A further object of the invention is the development of a process for the production of a C-homosteroid of the formula

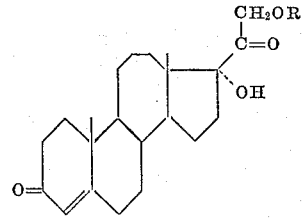

wherein R is selected from the group consisting of hydrogen and the acyl radical of an organic carboxylic acid having from one to eighteen carbon atoms, which comprises the steps of (a) Reacting 5β-pregnane - 17α,21 - diol-3,11,20-trione with aqueous formaldehyde and a mineral acid, (b) Treating the 17α-20,20-21-bis-methylenedioxy-7β-pregnane-3,11-dione with a ketal forming agent under ketalizing conditions, (c) Contacting the 3-ketal-17α-20,20-21-bis-methylenedioxy-5β-pregnane-11-one with methyllithium in an inert organic solvent, (d) Subjecting the 3 - ketal - 11α-methyl-17α-20,20-21-bis-methylenedioxy-5β-pregnane-11β01 to the action of a dehydrating agent, (g) Contacting the 9,11-seco-11-methyl-17α-20,20-21-bis-methylenedioxy-Δ⁹⁽¹¹⁾-5β-pregnene in the presence of an aqueous mineral acid in an inert organic solvent, (f) Subjecting the 11-methyl-17α-20,20-21-bis-methylenedioxy-Δ⁹⁽¹¹⁾-5β-pregnene-3-one to the action of ozone in a polar organic solvent, (g) Contacting the 9,11-seco-11-methyl-17a-20,20-21-bis-methylenedioxy-5β-pregnane-3,9,11-trione with an alkaline cyclization agent in an inert organic solvent, (h) Treating the 17α-20,20,21-bis-methylene dioxy-C-homo-Δ⁹⁽¹¹⁾-5β-pregnene-3,12-dione with a mixed metal hydride reducing agent, (i) Subjecting the 17α-20,20-21-bis-methylenedioxy-C-homo-Δ⁹⁽¹¹⁾-5β-pregnene-3α, 12ξ-diol to the action of an acidic dehydrating agent, (j) Selectively hydrogenating the 12(12a) double bond of the 17α,20,21-21-bis-methylenedioxy - C - homo-Δ⁹⁽¹¹⁾, 12(12a)-5β-pregnandiene-3α-ol by contacting with hydrogen in the presence of a hydrogenation catalyst in a lower alkanolic media, (k) Hydrogenating the 9(11) double bond of the 17α 20,20-21-bis-methylenedioxy-C - homo-Δ⁹⁽¹¹⁾-5β-pregnene-3α-ol by contacting with hydrogen in the presence of a hydrogenation catalyst in an acidic media, (l) Treating the 17α - 20,20 - 21-bis-methylenedioxy-C-homo-5β-pregnane-3α-ol with an oxidizing agent, in an inert solvent, (m) Reacting the 17α-20,20-21-bis-methylenedioxy-C-homo-5β-pregnane-3-one with bromine, (n) Dehydrobrominating the 4ξ-bromo-17α-20,20-21-bis-methylenedioxy-C-homo-5β-pregnane-3-one by the action of a dehydrobrominating agent, (o) Hydrolizing the 17α-20,20-21-bis-methylenedioxy-C-homo-Δ⁴-pregnene-3-one in the presence of aqueous formic acid, and (p) Recovering said C-homo-steroid.

A still further object of the invention is the obtention of the novel intermediate products:

(a) 17α - 20,20 - 21 - bis-methylenedioxy-5β-pregnane-3,11-dione, (b) 3-ethylenedioxy - 17α20,20-21-bis-methylenedioxy-5β-pregnane-11-one, (c) 3-ethylenedioxy - 11α-20,20-21-bis-methylenedioxy-5β-pregnane-11β-ol.

(d) 3-ethylenedioxy - 11-methyl-17α-20,20-21-bis-methylenedioxy-Δ⁹⁽¹¹⁾-5β-pregnene.

(e) 11 - methyl - 17α - 20,20 - 21-bis-methylenedioxy-Δ⁹⁽¹¹⁾-5β-pregnene-3-one, (f) 9,11 - seco - 11-methyl-17α-20,20-21-bis-methylenedioxy-5β-pregnane-3,9,11-trione, (g) 17α-20,20-21-bis-methylenedioxy - C - homo-Δ⁹⁽¹¹⁾-5β-pregnene-3,12-dione and the corresponding 3-ethylene ketal, (h) 17α-20,20-21-bis-methylenedioxy - C-homo-Δ⁹⁽¹¹⁾-5β-pregnene-3α,12ξ-diol, (i) 17α-20,20-21-bis-methylenedioxy - C - homo-Δ⁹⁽¹¹⁾, 12(12a)-5β-pregnadiene-3α-ol, (j) 17α-20,20-21 - bis-methylenedioxy - C-homo-Δ⁹⁽¹¹⁾-5β-pregnene-3α-ol, (k) 17α-20,20-21 - bis-methylenedioxy - C - homo-5β-pregnane-3α-ol, (l) 17α - 20,20 - 21 - bis-methylenedioxy-C-homo-5β-pregnane-3-one, (m) 4ξ - bromo - 17α-20,20-21-bis-methylenedioxy-C-homo-5β-pregnane-3-one, (n) 17α-20,20 - 21 - bis - methylenedioxy-C-homo-Δ⁴-pregnene-3-one.

These and other objects of the invention will become more apparent as the description thereof proceeds.

The C-homo-steroids of the formula

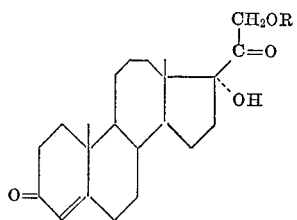

wherein R is selected from the group consisting of hydrogen and the acyl radical of an organic carboxylic acid having from one to eighteen carbon atoms, and particularly C-homo-Δ⁴-pregnene-17α,21-diol-3,20-dione and its 21 ester with acetic acid, possess interesting physiological properties. They are endowed particularly with an anti-aldosteronic activity.

It has been found that the treatment by an alkaline cyclization agent of 11-methylated 9,11-seco-9,11-diketonic steroids obtained by the oxidation of the corresponding 9,11-dehydro derivatives provokes in an unexpected manner a condensation of the ketone in the 9-position with the methyl in the 11-position, thus furnishing derivatives having an enlarged C ring, having 7 carbon atoms in the ring, and called hereafter C-homo steroids. The course of the above reactions can be illustrated by the partial flow diagram hereafter:

TABLE I

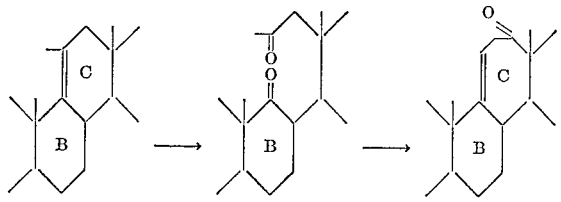

The complete process of preparation of the new products, the object of the present invention, is illustrated by the flow diagram of Table II.

TABLE II

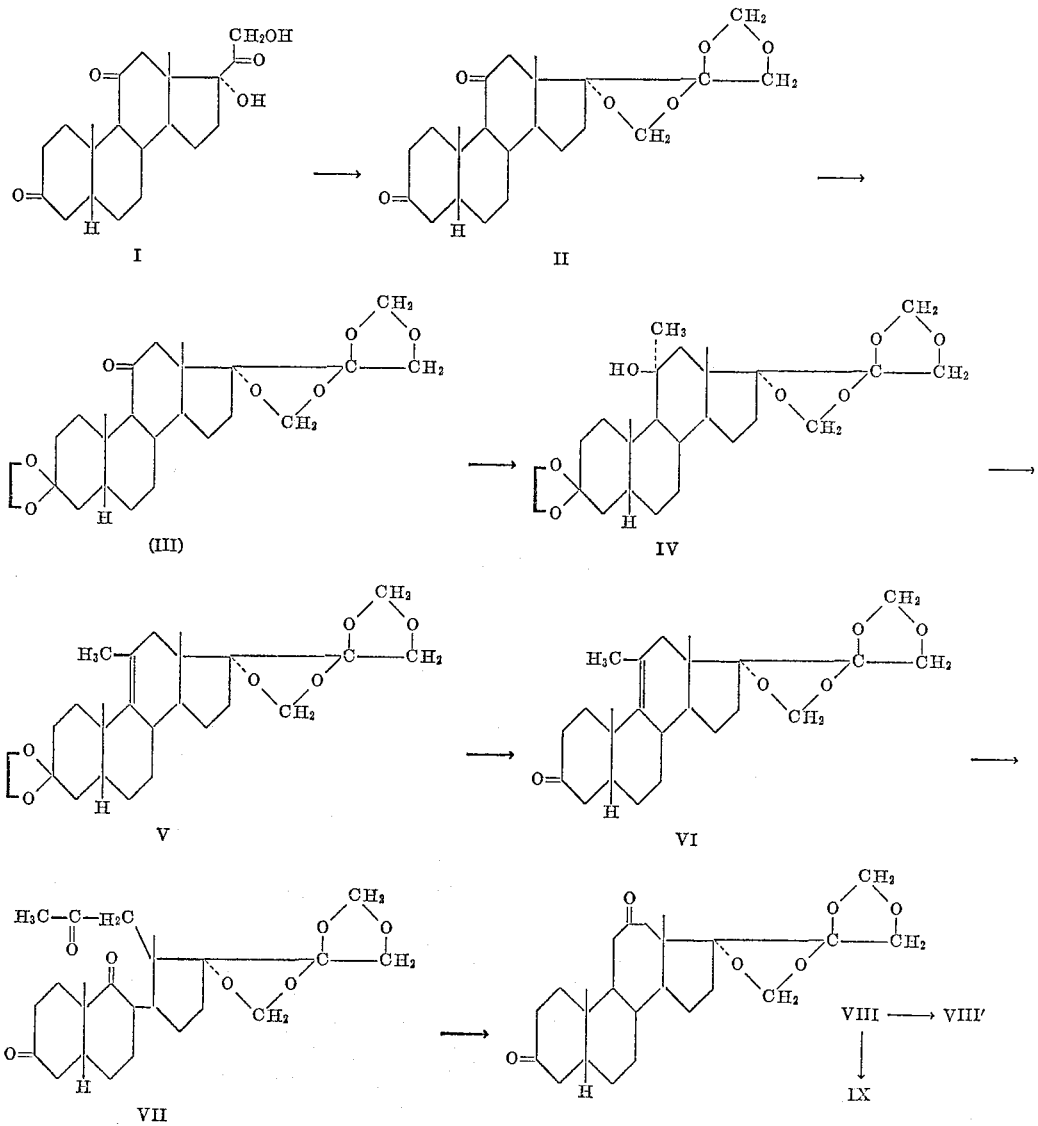

TABLE II—Continued

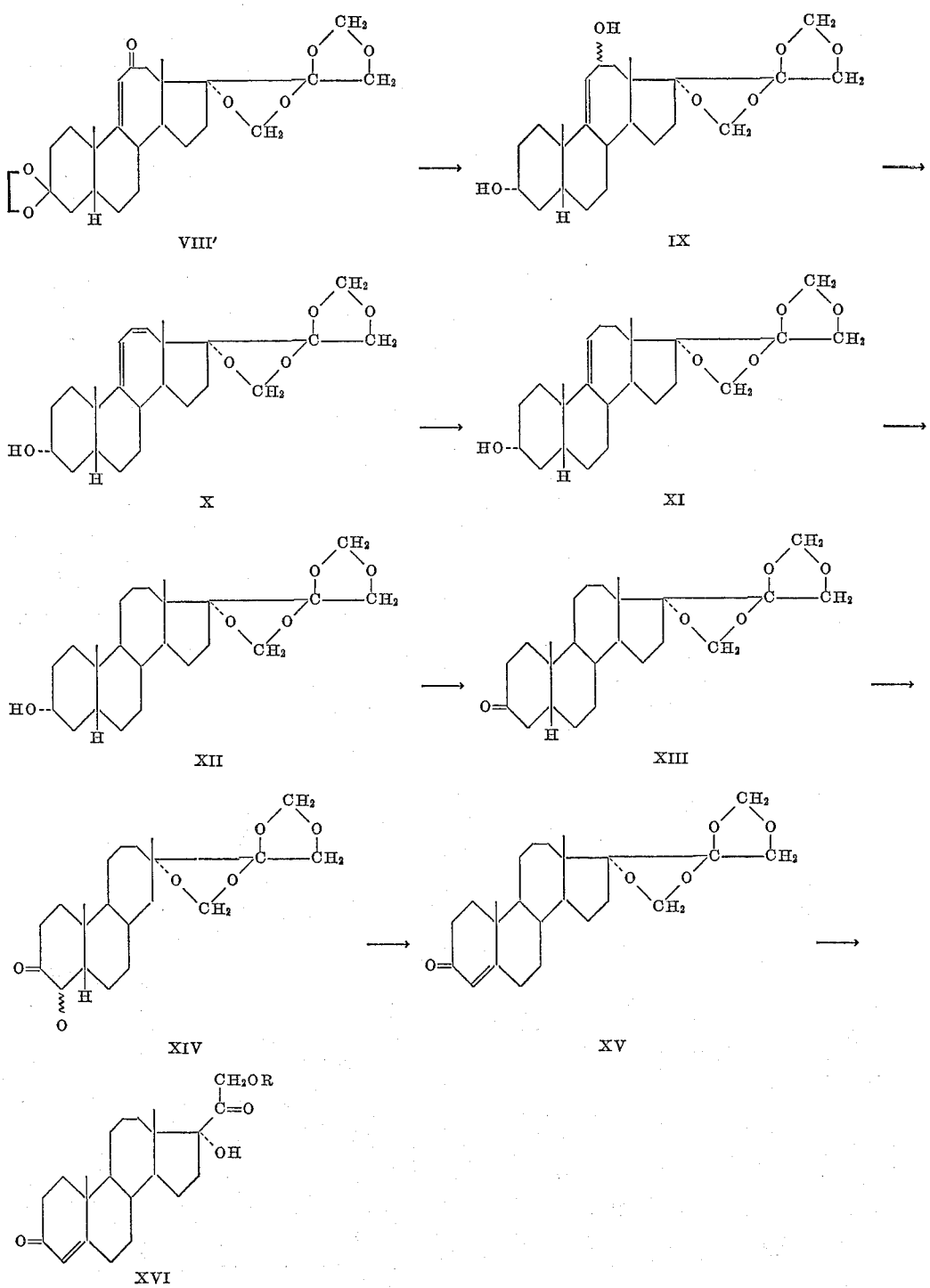

R = hydrogen or the acyl radical of an organic carboxylic acid having from one to eighteen carbon atoms.

The said process is characterized essentially in that the ketolic chain in the 17-position of 5β-pregnane-17α,21-diol-3,11,20-trione is deactivated by formation of the 17α-20,20-21-bis-methylenedioxy derivative which is obtained by reaction with aqueous formaldehyde in the presence of a mineral acid. The keto group in the 3-position of the 17α-20,20-21-bis-methylenedioxy-5β - pregnane-3-11-dione is protected by the formation of a ketal. Then the 3 - ketal - 17α,20,20,21-bis-methylenedioxy-5β-pregnane-11-one is reacted with methyl lithium in an inert organic solvent. The resulting 11-methyl carbinol 3-ketal 11α-methyl-17α-20,20-21-bis-methylenedioxy - 5β - pregnane-11β-ol, is subjected to the action of a dehydrating agent which furnishes the 3-ketal-11-methyl-17α-20,20-21-bis-methylenedioxy-Δ9(11)-5β-pregnene whose ketone in the 3-position is liberated by acid hydrolysis in the presence of an aqueous mineral acid in an inert organic solvent. The 11 - methyl - 17α - 20,20 - 21 - bis - methylenedioxy Δ9(11)-5β-pregnene-3-one is subjected to ozonization by the action of ozone in a polar organic solvent. 9,11-seco-11-methyl-17α - 20,20 - 21-bis-methylenedioxy-5β-pregnane-3,9,11-trione is obtained. This latter compound is treated by an alkaline cyclization agent in an inert organic solvent and 17α-20,20-21-bis-methylenedioxy-C-homo-Δ9(11)-5β-pregnene-3,12-dione is obtained. The ketone functions in the 3- and 12-positions of this latter compound are reduced by means of a mixed metal hydride reducing agent, preferably an alkali metal borohydride. The resulting 17α-20,20-21-bis-methylenedioxy - C - homo-$\Delta^{9(11)}$-5β-pregnene-3α,12ξ-diol is dehydrated by means of an acidic dehydrating agent, leading to 17α-20,20-21-bis-methylenedioxy-C-homo - $\Delta^{9(11),12(12a)}$ - 5β-pregnadiene-3α-ol. The double bond in the 12(12a)-position of the latter compound is selectively reduced by catalytic hydrogenation in the presence of a lower alkanol. 17α-20,20-21-bis-methylenedioxy - C - homo-$\Delta^{9(11)}$-5β-pregnene-3α-ol is obtained, whose double bond in the 9(11)-position is reduced by catalytic hydrogenation in the presence of an acidic media. The resulting 17α-20,20-21-bis-methylenedioxy-C-homo-5β-pregnane-3α-ol is subjected to the action of an oxidizing agent in an inert acidic solvent to furnish 17α-20,20-21-bis-methylenedioxy - C - homo-5β-pregnane-3-one. Bromine is introduced in the 4-position of this latter compound, preferably by means of the tribromide of trimethylphenylammonium. A dehydrobromination agent is made to react on the resultant 4ξ-bromo-17α-20,20-21-bis-methylenedioxy - C - homo-5β-pregnane-3-one which leads to 17α-20,20-21-bis-methylenedioxy-C-homo-$\Delta^4$-pregnene-3-one. This latter compound is subjected to acid hydrolysis with aqueous formic acid and finally the desired C-homo-$\Delta^4$-pregnene-17α,21-diol-3,20-dione is obtained which, if desired, can be transformed easily into the 21 ester of an organic carboxylic acid having from 1 to 18 carbon atoms.

The execution of the process of the invention can be further characterized by the following points:

(a) The reaction of 5β-pregnane-17α,21-diol-3,11,20-trione with aqueous formaldehyde and a mineral acid to give the 17α-20,20-21-bis-methylenedioxy derivative occurs preferentially at about room temperature. A strong mineral acid is preferred, especially concentrated hydrochloric acid.

(b) The ketone function in the 3-position of the 17α-20,20-21-bis-methylenedioxy - 5β - pregnane-3,11-dione is protected by the formation of a ketal. Any ketal forming compound can be employed although compounds forming cyclic ketals such as ethylene glycol, propylene glycol, 2,3-butylene glycol, methylethyldioxolane, etc., are preferred. The reaction takes place under ketalizing conditions of an elevated temperature below the refluxing temperature in the presence of an acidic catalyst such as p-toluene-sulfonic acid.

(c) The reaction with methyl lithium occurs at room temperature in the presence of an inert organic solvent such as benzene and/or ether.

(d) The dehydrating agent utilized in order to obtain the 3-ketal-11-methyl - 17α-20,20-21-bis-methylenedioxy-$\Delta^{9(11)}$-5β-pregnene is preferentially thionyl chloride in the presence of pyridine at a temperature of between room temperature and −20° C.

(e) The 3-ketal-11-methyl - 17α - 20,20-21-bis-methylenedioxy-$\Delta^{9(11)}$-5β-pregnene is hydrolyzed to free the ketone in the 3 position by the action, preferentially, of aqueous hydrochloric acid in the presence of a mixed solvent such as methylene chloride and methanol at the reflux temperature.

(f) The ozonization of 17α-20,20-21-bis-methylenedioxy-11-methyl-$\Delta^{9(11)}$-5β-pregnene-3-one is effected by passing ozone through a solution of the compound in a polar solvent and particularly in aqueous dimethylformamide.

(g) The cyclization of 9,11-seco-11-methyl 17α-20,20-21-bis-methylenedioxy-5β-pregnane-3,9,11-trione is effected with the aid of an alkali metal lower alkanolate in a lower alkanol and particularly with potassium t.-butylate in t.-butanol at refluxing temperatures.

(h) The mixed metal hydride employed for the reduction of 17α-20,20-21-bis-methylenedioxy-C-homo-$\Delta^{9(11)}$-5β-pregnene-3,12-dione is an alkali metal borohydride, particularly potassium borohydride in the presence of ethanol and of aqueous sodium hydroxide.

(i) The acid used for the dehydration of 17α-20,20-21-bis-methylenedioxy-C-homo-$\Delta^{9(11)}$ - 5β - pregnene-3α,12ξ-diol is preferably a strong mineral acid such as perchloric acid in the presence of an anhydrous organic solvent, such as tetrahydrofuran.

(j) The selective reduction of the double bond in the 12(12a) position of 17α-20,20-21-bis-methylenedioxy-C-homo-$\Delta^{9(11),12(12a)}$-5β-pregnadiene-3α-ol is effected in the presence of palladized carbon black as hydrogenation catalyst and in ethanol as the lower alkanol.

(k) The hydrogenation of the double bond in the 9(11) position of 17α-20,20-21-bis-methylenedioxy-C-homo-$\Delta^{9(11)}$-5β-pregnene-3α-ol is effected in the presence of platinum as hydrogenation catalyst, preferably introduced in the reaction mixture in the form of platinum oxide, and acetic acid as the acidic media.

(l) The oxidizing agent employed for the obtention of 17α-20,20-21-bis-methylenedioxy - C - homo - 5β - pregnane-3-one is preferably an acidic oxidizing agent such as the mixture of sulfuric and chromic acids in an inert solvent such as acetone or aqueous acetic acid.

(m) The tribromide of trimethylphenylammonium is made to react on 17α-20,20-21-bis-methylenedioxy-C-homo-5β-pregnane-3-one preferably in tetrahydrofuran at a temperature below room temperature.

(n) The dehydrobromination agent employed for the obtention of 17α - 20,20-21-bis-methylenedioxy-C-homo-$\Delta^4$-pregnene-3-one is the mixed salt of lithium bromide and lithium carbonate in the presence of dimethylformamide.

(o) The acid hydrolysis of 17α-20,20-21-bis-methylenedioxy-C-homo-$\Delta^4$-pregnene-3-one is effected by means of aqueous formic acid at an elevated temperature up to the reflux temperature of the mixture in an inert atmosphere.

If desired, the C-homo-$\Delta^4$-pregnene 17α-21-diol-3,20-dione can be esterified in the 21 position by reacting it with a derivative of an organic carboxylic acid having from one to eighteen carbon atoms selected from the group consisting of the free acid, the acid chloride and the acid anhydride under esterifying conditions. Preferably C-homo-$\Delta^4$-pregnene-17α,21-diol-3,20-dione is reacted with the acid anhydride of an alkanoic acid such as acetic acid in the presence of pyridine.

Among the organic carboxylic acids having from one to eighteen carbon atoms which can be employed in the form of their esterifying derivatives are the alkanoic acids, such as acetic acid, propionic acid, valeric acid, lauric acid, stearic acid, etc.; alkenoic acids, such as undecylenic acid, oleic acid, etc.; phenyl carboxylic acids, such as benzoic acid, phthalic acid, salicylic acid, etc.; cycloalkanoic acids, such as cyclohexanoic acid, hexahydrophthalic acid, etc.; cycloalkylalkanoic acids, such as cyclohexylactic acid, cyclohexylpropionic acid, etc.; and phenyl alkanoic acids, such as phenylacetic acid, p-methylphenyl acetic acid, etc.

The following examples are illustrative of the invention. They are not, however, to be construed as limitative as other expedients known to those skilled in the art may be employed.

EXAMPLE I

*Preparation of C-Homo-$\Delta^4$-Pregnene-17α,21-Diol-3,20-Dione (Compound XVI, R=H)*

STEP A

17α-20,20-21-Bis-Methylenedioxy-5β-Pregnane-3,11-Dione (Compound II)

48 g. of 5β-pregnane-17α,21-diol-3,11,20-trione were placed in suspension in 2 liters of chloroform under an atmosphere of nitrogen. 500 cc. of 32% formaldehyde solution and 500 cc. of concentrated hydrochloric acid were added and the reaction mixture was agitated for a period of 60 hours, then poured into water. The organic phase was decanted, washed with water and dried over magnesium sulfate. Thereafter, it was passed through 500 g. of alumina and eluted with methylene chloride.

The solution was distilled to dryness. The residue was taken up with ether, iced, vacuum filtered, washed with water and dried. 16 g. of 17α-20,20-21-bis-methylenedioxy-5β-pregnane-3,11-dione (II) (being a yield of 30%) were obtained having a melting point of 192° C. and a specific rotation $[\alpha]_D^{20} = -40° \pm 5°$ (c.=0.5% in chloroform).

The product occurred in the form of colorless crystals and was insoluble in water and dilute aqueous acids and alkalis, slightly soluble in alcohol and ether, and soluble in acetone, benzene and chloroform.

*Analysis.*—$C_{23}H_{32}O_6$; molecular weight=404.49. Calculated: C, 68.29%; H, 7.97%. Found: C, 68.3%; H, 7.9%.

The product is not described in the literature.

STEP B

3-Ethylenedioxy-17α-20,20-21-Bis-Methylenedioxy-5β-Pregnane-11-One (Compound III)

26 g. of 17α-20,20-21-bis-methylenedioxy-5β-pregnane-3,11-dione (II) were dissolved in 80 cc. of hot methylethyldioxolane. 260 mg. of p-toluene-sulfonic acid were added thereto and the reaction mixture was agitated for a period of 20 minutes. Next, it was cooled to room temperature and 250 cc. of petroleum ether were added. The product obtained was vacuum filtered, washed with petroleum ether and dried. Thereafter it was dissolved in methylene chloride. The solution was treated with animal carbon black and filtered. Methanol was added thereto and the solution was concentrated. The concentrated solution was iced and vacuum filtered. The precipitate was washed with petroleum ether and dried in order to obtain 26 g. of 3-ethylenedioxy-17α-20,20-21-bis-methylenedioxy-5β-pregnane-11-one (III) (being a yield of 90%), having a melting point of about 150° C. and a specific rotation $[\alpha]_D^{20} = -41° \pm 5°$ (c.=0.5% in chloroform).

The product occurred in the form of colorless crystals and was insoluble in water and dilute acids and alkalis, slightly soluble in alcohol and ether, and very soluble in acetone, benzene and chloroform.

*Analysis.*—$C_{25}H_{36}O_7$; molecular weight=448.54. Calculated: C, 66.94%; H, 8.09%. Found: C, 66.7%; H, 7.9%.

The product is not described in the literature.

STEP C

3-Ethylenedioxy-11α-Methyl-17α20,20-21-Bis-Methylenedioxy-5β-Pregnane-11β-ol (Compound IV)

10 g. of 3-ethylenedioxy-17α-20,20-21-bis-methylenedioxy-5β-pregnane-11-one (III) were dissolved in 80 cc. benzene and the solution was poured slowly into 150 cc. of a 3.7% solution of methyl lithium in ether.

The reaction mixture was agitated for a period of 4 hours. Next the mixture was poured on ice and washed with water. The solution was extracted with ether. The ethereal extracts were dried over magnesium sulfate and distilled to dryness under vacuum. 12 g. of raw 3-ethylenedioxy-11α-methyl-17α-20,20-21-bis-methylenedioxy-5β-pregnane-11β-ol (IV) were thus obtained which was utilized as such for the following step.

For analysis, the raw product, IV, was recrystallized from a mixture of methylene chloride and isopropyl ether and colorless crystals were obtained which were insoluble in water, dilute aqueous acids and alkalis, slightly soluble in ether, soluble in alcohol and very soluble in acetone, benzene and chloroform. The purified crystals of 3-ethylenedioxy-11α-methyl-17α-20,20-21-bis-methylenedioxy-5β-pregnane-11β-ol, IV, had a melting point of 220° C. and a specific rotation $[\alpha]_D^{20} = -59° \pm 2°$ (c.=1% in chloroform).

*Analysis.*—$C_{26}H_{40}O_7$; molecular weight=464.58. Calculated: C, 67.21%; H, 8.68%. Found: C, 67.1%; H, 8.9%.

The product is not described in the literature.

STEP D

3-Ethylenedioxy-11-Methyl-17α - 20,20-21 - Bis - Methylenedioxy-$\Delta^{9(11)}$-5β-Pregnene (Compound V)

12 g. of raw 3-ethylenedioxy-11α-methyl-17α-20,20-21-bis-methylenedioxy-5β-pregnane-11β-ol (IV) obtained by the preceding step were dissolved in 25 cc. of pyridine. This solution was poured onto a mixture of 12 cc. of thionyl chloride and 85 cc. of pyridine and cooled to −10° C.

The reaction mixture was agitated for a period of 30 minutes. Then the reaction mixture was poured on ice and 60 cc. of concentrated hydrochloric acid were added thereto. The solution was extracted with petroleum ether. The extracts were washed with water, dried, treated with animal carbon black, filtered and evaporated to dryness under vacuum. The residue was crystallized from petroleum ether, 3-ethylenedioxy-11-methyl-17α-20,20-21-bis-methylenedioxy-$\Delta^{9(11)}$-5β-pregnene (V) was obtained having a melting point of 184° C. and a specific rotation $[\alpha]_D^{20} = -55° \pm 5°$ (c.=0.5% in chloroform).

The product occurred in the form of colorless crystals and was insoluble in water and dilute aqueous acids and alkalis, slightly soluble in ether, soluble in alcohol and very soluble in acetone, benzene and chloroform.

*Analysis.*—$C_{26}H_{38}O_6$; molecular weight=446.56. Calculated: C, 69.94%; H, 8.58%. Found: C, 70.1%, H, 8.7%.

The product is not described in the literature.

STEP E

11-Methyl-17α-20,20-21-Bis-Methylenedioxy-$\Delta^{9(11)}$-5β-Pregnene-3-one (Compound VI)

The 3-ethylenedioxy-11-methyl-17α-20,20-21 - bis-methylenedioxy-$\Delta^{9(11)}$-5β-pregnene (V) obtained according to the preceding step was dissolved in 50 cc. of methanol and 25 cc. of methylene chloride. 5 cc. of 2 N hydrochloric acid solution were added thereto and the methylene chloride was removed by distillation. The product obtained was vacuum filtered, washed with isopropyl ether and dried. After crystallization from a mixture of methylene chloride and isopropyl ether, 4.59 g. of 11-methyl-17α-20,20-21-bis-methylenedioxy-$\Delta^{9(11)}$-5β - pregnene - 3 - one (VI) were obtained having a melting point of 244° C. This product was utilized as such in the following step.

For analysis, the product, VI, was purified by recrystallization from a mixture of water and acetone, and a mixture of methylene chloride and ethyl acetate. The purified 11-methyl-17α-20,20-21-bis-methylenedioxy-$\Delta^{9(11)}$-5β-pregnene-3-one (VI) melted at 244° C. It was insoluble in water and dilute aqueous acids and alkalis, very slightly soluble in ether, slightly soluble in alcohol and soluble in acetone, benzene and chloroform.

*Analysis.*—$C_{24}H_{34}O_5$; molecular weight=402.51. Calculated: C, 71.61%; H, 8.51%. Found: C, 71.5%; H, 8.5%.

Specific rotation $[\alpha]_D^{20} = -62° \pm 5°$ (c.=0.5% in chloroform).

The product is not described in the literature.

STEP F

11-Methyl-17α-20,20-21-Bis-Methylenedioxy-9,11-Seco-5β-Pregnane-3,9,11-Trione (Compound VII)

5 g. of 11-methyl-17α-20,20-21-bis-methylenedioxy-$\Delta^{9(11)}$-5β-pregnene-3-one (VI) were dissolved in 90 cc. of dimethylformamide and 10 cc. of water were added thereto.

A stream of ozone was allowed to bubble through the solution for a period of 7 hours. Then the ozone was removed by a stream of nitrogen. The reaction mixture was cooled and 0.5 cc. of methyl phosphite and 20 cc. of a 10% perchloric acid solution were added thereto. The mixture was heated to 60° C. for a period of 20 minutes and poured into water. The aqueous reaction mixture was extracted with methylene chloride. The extracts were washed with water and with N/10 sodium hydroxide solution, dried over magnesium sulfate and evaporated to dryness under vacuum.

The residue was dissolved in 25 cc. of ether and iced. The precipitate was vacuum filtered, washed with ether and dried. 3.37 g. of the raw product were recovered (being a yield of 62%) which was crystallized from ether in order to obtain pure 11-methyl-17α-20,20-21-bis-methylenedioxy-9,11-seco-5β-pregnane - 3,9,11 - trione (VII) having a melting point of 173° C. and a specific rotation $[\alpha]_D^{20} = -120° \pm 10°$ (c.=0.16% in chloroform).

The product occurred in the form of colorless crystals and was insoluble in water and dilute aqueous acids and alkalis, slightly soluble in ether, soluble in alcohol and very soluble in acetone, benzene and chloroform.

*Analysis.*—$C_{24}H_{34}O_7$; molecular weight=434.51. Calculated: C, 66.34%; H, 7.89%. Found: C, 66.1%; H, 7.8.

The product is not described in the literature.

STEP G

17α-20,20-21-Bis-Methylenedioxy-C-Homo-Δ$^{9(11)}$-5β-Pregnene-3,12-Dione (Compound VIII)

3.6 g. of 11-methyl-17α-20,20-21-bis-methylenedioxy-9,11-seco-5β-pregnane-3,9,11-trione (VII) were dissolved in 180 cc. of toluene. 30 cc. of a 1 N solution of potassium t.-butylate in t.-butanol were introduced and thereafter 108 cc. of toluene were added while slowly distilling a part of the solvent in such a manner as to hold the volume constant. Next the solution was evaporated to a small volume. Then the reaction mixture was poured into water. The aqueous phase was decanted and extracted with methylene chloride. The extracts were combined, dried over magnesium sulfate and evaporated to dryness under vacuum. The product was crystallized from a mixture of methylene chloride and isopropyl ether and 2.37 g. of 17α-20,20-21-bis-methylenedioxy-C-homo-Δ$^{9(11)}$-5β-pregnene-3,12-dione (VIII) were obtained having a melting point of 170° C., then 217° C. and a specific rotation $[\alpha]D^{20} = -64° \pm 10°$ (c.=0.25% in chloroform).

The product occurred in the form of colorless crystals and was insoluble in water and dilute aqueous acids and alkalis, slightly soluble in ether and soluble in alcohol, acetone, benzene and chloroform.

*Analysis.*—$C_{24}H_{32}O_6$; molecular weight=416.50. Calculated: C, 69.21%; H, 7.74%. Found: C, 69.0%; H, 7.6.

The product is not described in the literature.

17α - 20,20 - 21 - bis-methylenedioxy-C-homo-Δ$^{9(11)}$-5β-pregnene-3,12-dione (VIII) was characterized by transformation into 3-ethylenedioxy-17α-20,20-21-bis-methylenedioxy-C-homo-Δ$^{9(11)}$-5β-pregnene-12-one (VIII').

A mixture of 500 mg. of 17α-20,20-21-bis-methylenedioxy-C-homo-Δ$^{9(11)}$-5β-pregnene-3,12-dione (VIII), 3 cc. of methylethyldioxolane and 6 mg. of p-toluenesulfonic acid were heated to 90° C. for a period of an hour. Thereafter, one drop of pyridine was added and the mixture was distilled to dryness under vacuum. The residue was taken up with isopropyl ether. A crystallizate was formed which was vacuum filtered, washed with ether and dried in order to obtain 450 mg. of compound (VIII').

The 3 - ethylenedioxy-17α-20,20-21-bis-methylenedioxy-C-homo-Δ$^{9(11)}$-5β-pregnene-12-one (VIII') having a melting point of 201° C. and a specific rotation $$[\alpha]_D^{20} = -22° \pm 2°$$

(c.=1% in chloroform) occurred in the form of colorless crystals and was insoluble in water, and dilute aqueous acids and alkalis, very slightly soluble in ether, slightly soluble in alcohol and soluble in acetone, benzene and chloroform.

*Analysis.*—$C_{26}H_{36}O_7$; molecular weight=460.55. Calculated: C, 67.80%; H, 7.88%. Found: C, 67.9%; H, 7.8.

This compound is not described in the literature.

STEP H

17α-20,20-21-Bis-Methylenedioxy-C-Homo-Δ$^{9(11)}$-5β-Pregnene-3α,12ξ-Diol (IX)

15.6 g. of 17α-20,20-21-bis-methylenedioxy-C-homo-Δ$^{9(11)}$-5β-pregnene-3,12-dione (VIII) and 7.8 g. of potassium borohydride were introduced into 315 cc. of absolute ethanol and 62 cc. of aqueous sodium hydroxide. The entire mixture was heated to reflux for a period of about 4 hours, then cooled and poured into water. The aqueous solution was extracted with methylene chloride. The extracts were washed with water until the wash waters were neutral, dried over magnesium sulfate and distilled to dryness. A residue of raw 17α-20,20-21-bis-methylenedioxy - C - homo-Δ$^{9(11)}$-5β-pregnene-3α,12ξ-diol (IX) was obtained which was used as such for the next step of the synthesis.

This compound is not described in the literature.

STEP I

17α-20,20-21-Bis-Methylenedioxy-C-Homo-Δ$^{9(11),12(12a)}$-5β-Pregnadiene-3α-Ol (X)

All of the raw 17α - 20,20-21-bis-methylenedioxy-C-homo-Δ$^{9(11)}$-5β-pregnene-3α,12ξ-diol (IX) obtained in the preceding step was taken up with 156 cc. of tetrahydrofuran and 32 cc. of a 10% aqueous solution of perchloric acid. The mixture was heated to reflux for a period of a half hour, then cooled and poured into water. The solution was extracted with methylene chloride. The extracts were washed successively with N/10 sodium hydroxide solution and with water, dried and distilled to dryness under vacuum. The residue was dissolved in 160 cc. of methylene chloride. The solution was passed through a column of magnesium silicate, eluted with methylene chloride containing 0.5% of methanol and the solution obtained was distilled to dryness. Raw compound X was recovered which was purified by successive crystallizations from isopropyl ether and a mixture of methylene chloride and isopropyl ether. 6.96 g. of 17α-20,20 - 21 - bis - methylenedioxy-C-homo-Δ$^{9(11),12(12a)}$-5β-pregnadiene-3α-ol (X) were obtained having a melting point of 188° C. Starting from the mother liquors, a second yield of the product of 0.50 g. was obtained.

This compound is not described in the literature.

STEP J

17α-20,20-21-Bis-Methylenedioxy-C-Homo-Δ$^{9(11)}$-5β-Pregnene-3α-Ol (XI)

2.6 g. of animal carbon block and 1.3 g. of potassium acetate were introduced into 1.3 cc. of palladium chloride and 130 cc. of water. Hydrogen was passed therethrough until the solution was saturated. The catalyst was vacuum filtered, washed successively with water and with ethanol. The catalyst thus prepared was introduced into a solution of 10.4 g. of 17α-20,20-21-bis-methylenedioxy-C-homo-Δ$^{9(11),12(12a)}$-5β-pregnadiene-3α-ol (X) in 208 cc. of ethanol. Thereafter, under agitation, 620 cc. of hydrogen were passed through the solution over a period of about 20 minutes. The solution was vacuum filtered and the residue was washed with ethanol. The ethanolic filtrate and wash liquors were combined and distilled to dryness under vacuum. The residue was dissolved in 20 cc. of methylene chloride. 100 cc. of isopropyl ether were added thereto and the solution was concentrated to a volume of 25 cc. The concentrate was iced. The crystals obtained were vacuum filtered, washed and dried. 7.45 g. of raw compound XI were obtained which were purified by crystallization from a mixture of methylene chloride and isopropyl ether. The purified 17α - 20,20 - 21 - bis-methylenedioxy - C - homo-Δ$^{9(11)}$-5β-pregnene-3α-ol (XI) had a melting point of 176° C. and a specific rotation $$[\alpha]_D^{20} = -121° \pm 2°$$

(c.=0.65% in chloroform).

The product was very soluble in acetone, benzene and chloroform, soluble in alcohol and ether and insoluble in water and dilute aqueous acids and alkalis.

*Analysis.*—$C_{24}H_{36}O_5$; molecular weight=404.53. Calculated: C, 71.25%; H, 8.97%. Found: C, 71.5%; H, 9.1%.

This compound is not described in the literature.

STEP K

17α-20,20-21-Bis-Methylenedioxy-C-Homo-5β-Pregnane-3α-Ol (XII)

1 g. of 17α - 20,20 - 21 - bis - methylenedioxy-C-homo-Δ$^{9(11)}$-5β-pregnene-3α-ol (XI) and 200 mg. of platinum oxide were introduced into 20 cc. of acetic acid. The mixture was subjected to hydrogenation, under agitation, for a period of about 30 minutes (absorption in the neighborhood of 90 cc. of hydrogen). Next the solution was vacuum filtered. The residue was washed with acetic acid and the solution obtained was distilled to dryness under vacuum. The residue was taken up with isopropyl ether. The crystals formed were vacuum filtered, washed and dried. 685 mg. of raw compound XII were obtained which were purified by crystallization from a mixture of methylene chloride and isopropyl ether. The purified 17α-20,20-21-bis-methylenedioxy-C-homo-5β-pregnane-3α-ol (XII) had a melting point of 185° C. and a specific rotation $[\alpha]_D^{20}=-95°\pm2°$ (c.=0.65% in chloroform).

The product was very soluble in acetone, benzene and chloroform, soluble in alcohols and ether, and insoluble in water and dilute aqueous acids and alkalis.

*Analysis.*—$C_{24}H_{38}O_5$; molecular weight=406.54. Calculated: C, 70.90%; H, 9.42%; O, 19.68%. Found: C, 70.9%; H, 9.3%; O, 19.4%.

This compound is not described in the literature.

STEP L

17α-20,20-21-Bis-Methylenedioxy-C-Homo-5β-Pregnane-3-One (XIII)

100 mg. of 17α-20,20-21-bis-methylenedioxy-C-homo-5β-pregnane-3α-ol (XII) were dissolved in 2 cc. of acetic acid and 0.2 cc. of water. The solution obtained was cooled towards +5° C. and slowly 0.1 cc. of a sulfochromic acid solution having 20% chromic acid anhydride and 30% sulfuric acid were introduced. The entire mixture was subjected to agitation for a period of about 5 minutes at a temperature between 0° C. and 5° C. Then 20 cc. of water were slowly added. The crystals formed were vacuum filtered, washed with water and dried. 90 mg. of raw compound XIII were thus obtained which were purified by crystallization from a mixture of methylene chloride and isopropyl ether. The purified 17α-20,20-21-bis-methylenedioxy - C - homo-5β-pregnane-3-one (XIII) had a melting point of 152° C. and a specific rotation $[\alpha]_D^{20}=-88°\pm2°$ (c.=1% in chloroform).

The product was very soluble in acetone, benzene and chloroform, soluble in alcohol and ether and insoluble in water and dilute aqueous acids and alkalis.

*Analysis.*—$C_{24}H_{36}O_5$; molecular weight=404.53. Calculated: C, 71.25%; H, 8.97%; O, 19.78%. Found: C, 71.3%; H, 8.8%; O, 19.4%.

This compound is not described in the literature.

STEP M

4ξ-Bromo-17α-20,20-21-Bis-Methylenedioxy-C-Homo-5β-Pregnane-3-One (XIV)

4.22 g. of 17α-20,20-21-bis-methylenedioxy-C-homo-5β-pregnane-3-one (XIII) were dissolved in 42 cc. of tetrahydrofuran. The solution obtained was cooled toward +5° C. and 4.85 g. of the tribromide of trimethylphenylammonium were added. The entire mixture was subjected to agitation for a period of 10 minutes at a temperature of about +5° C. Then the mixture was poured into water and extracted with methylene chloride. The extracts were washed with water, dried over magnesium sulfate and distilled to dryness under vacuum. The residue was raw 4ξ-bromo-17α-20,20-21-bis-methylenedioxy-C-homo-5β-pregnane-3-one (XIV) which was utilized as such for the following step of the synthesis.

This compound is not described in the literature.

STEP N

17α-20,20-21-Bis-Methylenedioxy-C-Homo-Δ$^4$-Pregnene-3-One (XV)

2.5 g. of anhydrous lithium bromide and 2.5 g. of lithium carbonate were introduced into 130 cc. of dimethylformamide. Then about 10 cc. were distilled therefrom and the raw 4ξ-bromo-17α-20,20-21-bis-methylenedioxy-C-homo-5β-pregnane-3-one (XIV) as prepared in the preceding step, dissolved in 20 cc. of dimethylformamide, was introduced. Next over a course of 20 minutes, the solution was concentrated to a volume of about 50 cc. Then the reaction mixture was cooled and poured into water. The pH was adjusted toward 5 by the addition of acetic acid. Then the solution was extracted with methylene chloride. The extracts were washed with water, dried over magnesium sulfate and passed through a column of magnesium silicate. The column was eluted with methylene chloride and a gum was isolated which was eliminated. Next the column was eluted with methylene chloride containing 0.4% of methanol. A gum was isolated which was crystallized from isopropyl ether. 1.59 g. of raw compound XV were obtained. The product was purified by recrystallization from a mixture of methylene chloride and isopropyl ether. The purified 17α - 20,20-21-bis-methylenedioxy-C-homo-Δ$^4$-pregnene-3-one (XV) had a melting point of 150° C., then 157° C. and a specific rotation $[\alpha]_D^{20}=-6°\pm2°$ (c.=0.8% in chloroform).

The product was very soluble in acetone, benzene and chloroform, soluble in alcohols and ether, and insoluble in water and dilute aqueous acids and alkalis.

*Analysis.*—$C_{24}H_{34}O_5$; molecular weight=402.51. Calculated: C, 71.61%; H, 8.51%. Found: C, 71.6%; H, 8.5%.

Ultraviolet spectra (ethanol):
  max. at 240 mμ, ε=17,100
  Infl. at 285 mμ, ε=420

This compound is not described in the literature.

STEP O

C-Homo-Δ$^4$-Pregnene-17α,21-Diol-3,20-Dione (XVI, R=H)

865 mg. of 17α-20,20-21-bis-methylenedioxy-C-homo-Δ$^4$-pregnene-3-one (XV) were introduced into 26 cc. of formic acid containing 40% water. The reaction mixture was heated to 95° C. under an atmosphere of nitrogen for a period of about 2 hours. Then the solution was cooled and poured into a saturated sodium chloride solution. This solution was extracted with methylene chloride. The extracts were washed successively with water, with N sodium hydroxide solution and with water, dried over magnesium sulfate and distilled to dryness. Raw C-homo-Δ$^4$-pregnene-17α,21-diol-3,20-dione (XVI, R=H) was obtained.

This compound is not described in the literature.

The product could be easily characterized in the form of a 21-ester such as the acetate.

EXAMPLE II

*21-Acetoxy-C-Homo-Δ$^4$-Pregnene-17α-Ol-3,20-Dione* (XVI, R=CH$_3$CO)

All of the raw C-homo-Δ$^4$-pregnene-17α,21-diol-3,20-dione (XVI, with R=H) obtained as described above in Example I was introduced into 4 cc. of pyridine and 2 cc. of acetic acid anhydride. The reaction mixture was heated for a period of about 10 minutes to 50° C., then cooled. 2 cc. of water were added thereto and the reaction was allowed to develop. Next the reaction mixture was poured into water and extracted with methylene chloride. The extracts were washed successively with N hydrochloric acid solution and with water, dried over magnesium sulfate, treated with animal carbon black and evaporated to dryness. The residue was taken up with ether and crystallized by cooling. The crystals formed were then vacuum filtered, washed with ether and dried. 480 mg. of the raw 21-acetate of C-homo-Δ⁴ - pregnene - 17α,21 - diol - 3,20 - dione (XVI, with R=CH₃CO) were thus obtained which was purified by crystallization from a mixture of methylene chloride and isopropyl ether. The purified 21-acetoxy-C-homo-Δ⁴-pregnene-17α-ol-3,20-dione (XVI, R=CH₃CO) had a melting point of 201° C. and a specific rotation $[\alpha]_D^{20}=+127°\pm2°$ (c.=0.55% in chloroform).

The product is very soluble in acetone, benzene and chloroform, soluble in alcohol and ether, and insoluble in water and dilute aqueous acids and alkalis.

*Analysis.*—$C_{24}H_{34}O_5$; molecular weight=402.51. Calculated: C, 71.61%; H, 8.51%. Found: C, 71.7%; H, 8.4%.

Ultraviolet spectra (ethanol):
   Max. at 241 mμ=16,600
   Infl. at 282 mμ=1,320

This compound is not described in the literature.

EXAMPLE III

*Purified C-Homo-Δ⁴-Pregnene-17α,21-Diol-3,20-Dione (XVI, R=H)*

The 21-acetate of C-homo-Δ⁴-pregnene-17α,21-diol-3,20-dione (XVI, R=—COCH₃) prepared as described in Example II was saponified by means of a 1 N aqueous solution of sodium hydroxide in the persence of methanol. Pure C - homo - Δ⁴ - pregnene - 17α,21 - diol - 3,20-dione (XVI, R=H) was obtained with a yield of 75%. The product had a melting point of 203° C. and a specific rotation $[\alpha]_D^{20}=+110°\pm5°$ (c.=0.2% in chloroform).

The product was soluble in acetone and chloroform, very slightly soluble in alcohols, very slightly soluble in ether and insoluble in dilute aqueous acids and alkalis.

*Analysis.*—$C_{22}H_{32}O_4$; molecular weight=360.48. Calculated: C, 73.30%; H, 8.95%; O, 17.76%. Found: C, 73.3%; H, 9.1%; O, 18.1%.

While a number of specific embodiments of the invention have been set forth above, it is to be understood that other expedients known to those skilled in the art may be employed without departing from the spirit of the invention or the scope of the appended claims.

We claim:

1. A C-homo-steroid of the formula

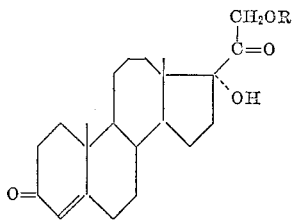

wherein R is selected from the group consisting of hydrogen and the acyl radical of an organic carboxylic acid having from one to eighteen carbon atoms.

2. C - homo - Δ⁴ - pregnene - 17α,21 - diol - 3,20-dione.

3. 21 - acetoxy - C - homo - Δ⁴ - pregnene - 17α - ol-3,20-dione.

4. 17α - 20,20 - 21 - bis - methylenedioxy - 5β - pregnane-3,11-dione.

5. 3 - ethylenedioxy - 17α - 20,20 - 21 - bis - methylenedioxy-5β pregnane-11-one.

6. 3 - ethylenedioxy - 11α - methyl - 17α - 20,20 - 21-bis-methylenedioxy-5β-pregnane-11β-ol.

7. 3 - ethylenedioxy - 11 - methyl - 17α - 20,20 - 21-bis-methylenedioxy-Δ⁹⁽¹¹⁾-5β-pregnene.

8. 11 - methyl - 17α - 20,20 - 21 - bis-methylenedioxy-Δ⁹⁽¹¹⁾-5β-pregnene-3-one.

9. 9,11 - seco - 11 - methyl - 17α - 20,20 - 21 - bis-methylenedioxy-5β-pregnane-3,9,11-trione.

10. 17α - 20,20 - 21 - bis-methylenedioxy - C - homo-Δ⁹⁽¹¹⁾-5β-pregnene-3,12-dione.

11. 3 - ethylenedioxy - 17α - 20,20 - 21 - bis-methylenedioxy-C-homo-Δ⁹⁽¹¹⁾-5β-pregnene-12-one.

12. 17α - 20,20 - 21 - bis-methylenedioxy - C - homo-Δ⁹⁽¹¹⁾-5β-pregnene-3α,12ξ-diol.

13. 17α - 20,20 - 21 - bis-methylenedioxy - C - homo-Δ⁹⁽¹¹⁾,¹²⁽¹²ᵃ⁾-5β-pregnadiene-3α-ol.

14. 17α - 20,20 - 21 - bis-methylenedioxy - C - homo-Δ⁹⁽¹¹⁾-5α-pregnene-3α-ol.

15. 17α - 20,20 - 21 - bis-methylenedioxy - C - homo-5β-pregnane-3α-ol.

16. 17α - 20,20 - 21 - bis-methylenedioxy-C-homo-5β-pregnane-3-one.

17. 4ξ - bromo - 17α - 20,20 - 21 - bis-methylenedioxy-C-homo-5β-pregnane-3-one.

18. 17α - 20,20 - 21 - bis-methylenedioxy-C-homo-Δ⁴-pregnene-3-one.

19. A process for the production of a C-homo-steroid of the formula

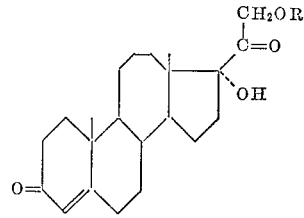

wherein R is selected from the group consisting of hydrogen and the acyl radical of an organic carboxylic acid having from one to eighteen carbon atoms, which comprises the steps of (a) reacting 5β-pregnane-17α,21 - diol - 3,11,20 - trione with aqueous formaldehyde and a mineral acid, (b) treating the 17α-20,20-21-bis-methylenedioxy-5β-pregnane-3,11-dione with a ketal forming agent under ketalizing conditions, (c) contacting the 3-ketal-17α-20,20-21-bis-methylenedioxy-5β-pregnane-11-one with methyllithium in an inert organic solvent, (d) subjecting the 3-ketal-11α-methyl-17α-20,20-21-bis-methylenedioxy-5β-pregnane-11β-ol to the action of thionyl chloride, (e) hydrolyzing the 3-ketal-11-methyl-17α-20,20-21-bis-methylenedioxy-Δ⁹⁽¹¹⁾-5β-pregnene in the presence of an aqueous mineral acid in an inert organic solvent, (f) subjecting the 11-methyl-17α-20,20-21-bis-methylenedioxy-Δ⁹⁽¹¹⁾-5β-pregnene-3-one to the action of ozone in a polar organic solvent, (g) contacting the 9,11-seco-11-methyl-17α-20,20-21-bis-methylenedioxy-5β-pregnane-3,9,11-trione with an alkali metal lower alkanolate in a lower alkanol, (h) treating the 17α-20,20-21-bis-methylenedioxy-C-homo-Δ⁹⁽¹¹⁾-5β-pregnene-3,12-dione with an alkali metal borohydride, (i) subjecting the 17α-20,20-21-bis-methylenedioxy-C-homo-Δ⁹⁽¹¹⁾-5β-pregnene-3α,12ξ-diol to the action of a strong mineral acid dehydrating agent in the presence of an anhydrous organic solvent, (j) selectively hydrogenating the 12(12a) double bond of the 17α - 20,20 - 21 - bis - methylenedioxy-C-homo-Δ⁹⁽¹¹⁾,¹²⁽¹²ᵃ⁾-5β-pregnadiene-3α-ol by contacting with hydrogen in the presence of a hydrogenation catalyst in a lower alkanolic media, (k) hydrogenating the 9(11) double bond of the 17α-20,20 - 21 - bis - methylenedioxy - C - homo -Δ⁹⁽¹¹⁾-5β-pregnene-3α-ol by contacting with hydrogen in the presence of a hydrogenation catalyst in an acidic media, (l) treating the 17α - 20,20 - 21 - bis - methylenedioxy-C-homo-5β-pregnane-3α-ol a sulfochromic acid oxidizing mixture in an inert solvent, (m) reacting the 17α-20,20-21-bis-methylenedioxy-C-homo-5β-pregnane-3-one with bromine, (n) dehydrobrominating the 4ξ-bromo-17α20,20-21-bis-methylenedioxy-C-homo-5β-pregnane-3-one by the action of a mixed lithium bromide-lithium carbonate dehydrobrominating agent, (o) hydrolyzing the 17α-20,20-21-bis-methylenedioxy-C-homo-$\Delta^4$-pregnene-3-one in the presence of aqueous formic acid, and (p) recovering said C-homo-steroid.

20. The process of claim 19 wherein C-homo-$\Delta^4$-pregnene-17α,21-diol-3,20-dione is recovered.

21. The process of claim 19 wherein 21-acetoxy-C-homo-$\Delta^4$-pregnene-17α-ol-3,20-dione is recovered.

22. The process of claim 19, step f, wherein said polar organic solvent is aqueous dimethylformamide.

23. The process of claim 19, step g, wherein said alkali metal lower alkanolate in a lower alkanol is potassium t.-butylate in t.-butanol.

24. The process of claim 19, step h, wherein said alkali metal borohydride is potassium borohydride in the presence of ethanol and aqueous sodium hydroxide.

25. The process of claim 19, step i, wherein said strong mineral acid dehydrating agent in the presence of an anhydrous organic solvent is perchloric acid in the presence of tetrahydrofuran.

26. The process of claim 19, step j, wherein said hydrogenation catalyst in a lower alkanolic media is palladized carbon black in ethanol.

27. The process of claim 19, step k, wherein said hydrogenation catalyst in an acidic media is platinum in acetic acid.

28. The process of claim 19, step l, wherein said inert solvent is acetone.

29. The process of claim 19, step l, wherein said inert solvent is aqueous acetic acid.

30. The process of claim 19, step m, wherein said bromine is in the form of the tribromide of trimethylphenylammonium in tetrahydrofuran.

31. The process of claim 19, step n, wherein said mixed lithium bromide-lithium carbonate dehydrobrominating agent is in the presence of dimethylformamide.

32. The process of producing 17α-20,20-21-bis-methylenedioxy-C-homo$\Delta^{9(11)}$-5β-pregnene-3,12-dione which comprises the steps of subjecting 11-methyl-17α-20,20,21-bis-methylenedioxy-$\Delta^{9(11)}$-5β-pregnene-3-one to the action of ozone in a polar organic solvent, contacting the 9-11-seco-11-methyl-17α-20,20-21-bis-methylenedioxy-5β-pregnane-3,9,11-trione with an alkali metal lower alkanolate in a lower alkanol and recovering said 17α-20,20-21-bis-methylenedioxy-C-homo-$\Delta^{9(11)}$-5β-pregnene-3,12-dione.

No references cited.

LEWIS GOTTS, *Primary Examiner.*

UNITED STATES PATENT OFFICE
CERTIFICATE OF CORRECTION

Patent No. 3,156,684                      November 10, 1964

Georges Muller et al.

It is hereby certified that error appears in the above numbered patent requiring correction and that the said Letters Patent should read as corrected below.

Column 1, line 70, for "7β" read -- 5β --; column 2, line 5, for "11β01" read -- 11β-ol; line 7, strike out "(g) Contacting the 9,11-seco" and insert instead -- (e) Hydrolyzing the 3-ketal --; line 23, for "21", first occurrence, read 20 --; column 4, TABLE I, the upper right-hand portion of the third set of benzene rings should appear as shown below instead of as in the patent:

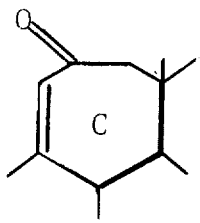

columns 3 and 4, TABLE II, formula IX, the upper left-hand portion of the formula should appear as shown below instead of as in the patent:

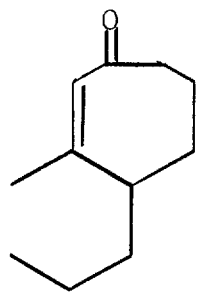

columns 5 and 6, TABLE II, formula XIV, the first benzene ring should appear as shown below instead of as in the patent:

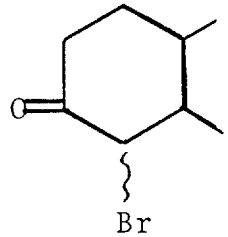

column 7, line 6, for "(12)a" read -- (12a) --; column 10, line 26, for "69.94%" read -- 69.93% --; column 12, line 7, for "osdium" read -- sodium --; column 12, lines 21 and 47, column 13, line 9, and column 14, line 65, for "Ol", each occurrence, read -- ol --; column 17, line 2, after "ol" insert -- with --.

Signed and sealed this 11th day of May 1965.

(SEAL)
Attest:

ERNEST W. SWIDER
Attesting Officer

EDWARD J. BRENNER
Commissioner of Patents